(12) United States Patent
Sumitani et al.

(10) Patent No.: US 8,910,512 B2
(45) Date of Patent: Dec. 16, 2014

(54) MULTI-COMPONENT FORCE MEASUREMENT SPINDLE UNIT OF TIRE TESTING MACHINE

(71) Applicant: Kobe Steel, Ltd., Kobe-shi (JP)

(72) Inventors: Takashi Sumitani, Hyogo (JP); Yu Sumimoto, Hyogo (JP); Naofumi Kanei, Hyogo (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/836,236

(22) Filed: Mar. 15, 2013

(65) Prior Publication Data

US 2013/0247657 A1 Sep. 26, 2013

(30) Foreign Application Priority Data

Mar. 22, 2012 (JP) .................. 2012-066106
Mar. 22, 2012 (JP) .................. 2012-066107

(51) Int. Cl.
*G01M 17/02* (2006.01)
*G01L 1/22* (2006.01)
*G01L 5/16* (2006.01)

(52) U.S. Cl.
CPC ............ *G01M 17/02* (2013.01); *G01M 17/021* (2013.01); *G01L 1/2206* (2013.01); *G01L 5/161* (2013.01); *G01L 5/16* (2013.01)
USPC .......................................................... 73/146

(58) Field of Classification Search
USPC ................................................. 73/146–146.8
See application file for complete search history.

(56) References Cited

U.S. PATENT DOCUMENTS

| | | | |
|---|---|---|---|
| 4,448,083 A | 5/1984 | Hayashi | |
| 5,014,551 A * | 5/1991 | Beebe et al. | ................. 73/146 |
| 5,481,907 A * | 1/1996 | Chasco et al. | ................. 73/146 |
| 2011/0000292 A1 | 1/2011 | Yoshikawa et al. | |
| 2011/0226050 A1 * | 9/2011 | Nakayama et al. | ............. 73/146 |
| 2012/0079868 A1 * | 4/2012 | Okada et al. | .................. 73/1.15 |
| 2013/0247657 A1 * | 9/2013 | Sumitani et al. | ............. 73/146 |
| 2014/0060181 A1 * | 3/2014 | Tachibana et al. | ............. 73/460 |

FOREIGN PATENT DOCUMENTS

| | | |
|---|---|---|
| JP | 57-169643 | 10/1982 |
| JP | 2003-4598 | 1/2003 |
| JP | 2005-326314 | 11/2005 |
| JP | 4310365 | 5/2009 |

* cited by examiner

*Primary Examiner* — Andre Allen
(74) *Attorney, Agent, or Firm* — Oblon, Spivak, McClelland, Maier & Neustadt, L.L.P.

(57) ABSTRACT

Disclosed is a multi-component force measurement spindle unit that accurately measures forces and moments applied to a tire in a tire testing machine. The multi-component force measurement spindle unit of a tire testing machine includes: a spindle shaft on which a tire can be mounted; an inner sleeve that rotatably supports the spindle shaft via a bearing part; an outer sleeve arranged on an outside of the inner sleeve along an axial center direction of the spindle shaft; a multi-component force measurement sensor that connects an end of the inner sleeve and an end of the outer sleeve to each other and is capable of measuring a load acting on the outer sleeve from the inner sleeve; and a cooling part that cools the inner sleeve.

9 Claims, 8 Drawing Sheets

SPINDLE UNIT ACCORDING TO EMBODIMENT

SPINDLE UNIT IN RELATED ART

MULTI-COMPONENT FORCE MEASUREMENT SPINDLE UNIT OF TIRE TESTING MACHINE

BACKGROUND OF THE INVENTION

1. Field of the Invention

The present invention relates to a multi-component force measurement spindle unit capable of measuring the various characteristics of tires.

2. Description of the Related Art

Generally, a known tire testing machine produces the contact state between a tire and a road surface in a simulated manner and measures forces and moments exerted on the tire by the road surface. The tire testing machine brings the tire supported by the spindle shaft of a spindle unit into contact with a rotation drum, etc., serving as the road surface in a state where predetermined loads are applied to the tire. Then, the tire testing machine measures a force (load) and a moment in each direction, which act on the rotating tire via the rotation drum, etc., with a multi-component force measurement sensor incorporated in the spindle unit.

For example, it is assumed that the pressing direction of the tire onto the rotation drum is a z-direction, the traveling direction (tangent line direction) of the tire is an x-direction, and a direction along the rotation shaft of the tire is a y-direction. In this case, the general tire testing machine can measure a force Fz (grounding load) directed to the z-direction, a force Fx (front-and-rear direction force or rolling resistance force) directed to the x-direction, a force Fy (cornering force) directed to the y-direction, a moment Mz (self-aligning torque) around the axis directed to the z-direction, a moment Mx (overturning moment) around the axis directed to the x-direction, a moment My (rolling resistance moment) around the axis directed to the y-direction, etc.

A strain gauge type has been often used as the above multi-component force measurement sensor. As described in, for example, Japanese Patent Application Publication No. S57-169643, the multi-component force measurement sensor of strain gauge type is structured such that a force applied body provided on the inner periphery side and a fixed body provided on the outer periphery side are connected to each other via a plurality of bar-like strain elements extending in the radial direction. The multi-component force measurement sensor detects the deformation of the strain elements with strain gauges to measure forces and moments acting on a tire.

As a tire testing machine using such a multi-component force measurement sensor, there has been known one described in, for example, Japanese Patent Publication No. 4310365. In the tire testing machine, the multi-component force measurement sensor is provided at either end of a housing (hereinafter referred to as inner sleeve) in the axial center direction, and the housing is supported by the multi-component force measurement sensors provided at two places with a space therebetween in the axial center direction. A force applied body on the inner periphery side of each of the multi-component force measurement sensors is fixed to the inner sleeve. In addition, a fixed body on the outer periphery side of the multi-component force measurement sensor is fixed to a support frame (base substance) or the like supporting a spindle unit, via a housing holding member (hereinafter referred to as outer sleeve). Thus, forces and moments acting on a tire are transmitted to strain elements via the inner sleeve to cause the deformation of the strain elements, and strain gauges detect the deformation of the strain elements to measure the forces and the moments acting on the tire.

Further, as a tire testing machine having only a single multi-component force measurement sensor, there has been known one described in, for example, Japanese Patent Application Publication No. 2003-4598. The tire testing machine has a spindle that brings a testing tire into pressure-contact with the outer periphery of a running drum. The spindle is attached at the center of the rotation shaft of the tire and supports the tire via bearings. In the tire testing machine, the multi-component force measurement sensor provided at a position apart from the tire of the spindle by a predetermined distance in the axial center direction of the spindle measures the relationship between the axle load Fz and the rolling resistance Fx of the tire to carry out a rolling resistance measurement method for the tire. In the tire testing machine, a spindle shaft is fixed to a support frame via the multi-component force measurement sensor so as not to rotate. Further, the tire is rotatably attached to one end of the spindle shaft via the bearings.

The spindle unit described in Japanese Patent Publication No. 4310365 is in a state where the translating and rotating motions of the spindle unit are constrained between the two multi-component force measurement sensors, i.e., the spindle unit is in a statistically intermediate state or in an overconstrained state.

In addition, bearing parts rotatably supporting a spindle shaft are provided between the inner sleeve and the spindle shaft. In the bearing parts, heat is generated with the rotation of the spindle shaft, and the generated heat is transmitted to both the inner sleeve and an outer sleeve. The inner sleeve and the outer sleeve are expanded by the heat thus transmitted, but the expanded states of the inner sleeve and the outer sleeve are different. The difference between the expanded states causes strains, and the strains act on both the multi-component force measurement sensors connected to the inner sleeve and the outer sleeve. That is, in the spindle unit in the overconstrained state between both the multi-component force measurement sensors, the strains resulting from the difference between the expanded state of the inner sleeve and that of the outer sleeve are caused in the multi-component force measurement sensors, and measurement errors corresponding to the strains are added to the measured values of loads and moments. Because of this, it becomes difficult to accurately measure the loads and the moments produced in the tire.

In order to avoid such a problem, the present inventors have attempted to provide a cooling mechanism that circulates the lubricating oil of bearing parts to positively cool the bearing parts. However, since heat is generated in the bearing parts in extremely large amounts, there was a case in which the heat generated in the bearing parts was not sufficiently removed with the cooling mechanism. In addition, it turns out that when the lubricating oil is supplied in large amounts to remove the heat, there may be a case that the lubricating oil is heated by stirring heat and heat is generated in the bearing parts.

Further, in the tire testing machine described in Japanese Patent Application Publication No. 2003-4598, the spindle shaft has a certain degree of length from one end to which the tire is attached in the axial center direction to the other end fixed to the support frame via the multi-component force measurement sensor. When loads act on the one end of the spindle shaft in a direction for pressing the tire onto the outer peripheral surface of the traveling drum, large moments are, of course, produced in the multi-component force measurement sensor provided at the other end of the spindle shaft. Therefore, the tire testing machine employs the multi-component force measurement sensor that can be resistant to large moments. Since such a multi-component force measurement sensor employs thick strain elements, etc., to resist acting large moments, the multi-component force measurement sensor cannot detect changes in minute force. As a result, the multi-component force measurement sensor is not allowed to perform detection with high accuracy.

A rolling resistance testing machine is required to detect changes in minute force acting on a spindle shaft with high accuracy. Therefore, it is desirable that a multi-component force measurement sensor used in the rolling resistance testing machine employ thin strain elements to a greater extent.

In view of this, the present inventors have attempted to hold a multi-component force measurement sensor close to a tire to reduce moments produced in the multi-component force measurement sensor. However, it turns out that when the multi-component force measurement sensor is held close to the tire, the influence of the heat generated in bearing parts becomes extremely large and thus the accuracy of the multi-component force measurement sensor is reduced. Therefore, the present inventors have attempted to provide bearing parts inside a housing on the side opposite to the tire with the multi-component force measurement sensor interposed therebetween, to cause a spindle shaft to be rotatably supported by the bearing parts, and to provide a cooling mechanism that circulates the lubricating oil of the bearing parts to positively cool the bearing parts. However, since heat is generated in the bearing parts in extremely large amounts, it may not be possible to sufficiently remove the influence of the heat generated in the bearing parts with the cooling mechanism. Moreover, it turns out that when the lubricating oil is supplied in large amounts to remove the heat, the lubricating oil is heated by stirring heat and thus the generation of the heat is spurred in the bearing parts on the contrary.

The present inventors have further studied over and over again and come to the following findings. When pressing forces act on a spindle shaft in a direction perpendicular to the spindle shaft, heat is likely to be generated only in part in the periphery direction of bearing parts supporting the spindle shaft. Therefore, compared with other parts in the periphery direction, the part in the periphery direction of the housing where the bearing parts are provided is thermally deformed on a large scale in the radial direction of the spindle shaft. Thus, the accuracy of a multi-component force measurement sensor is reduced.

SUMMARY OF THE INVENTION

It is an object of the present invention to provide a multi-component force measurement spindle unit of a tire testing machine that reduces thermal deformation in a constituent to allow the accurate measurement of forces and moments applied to a tire.

According to an aspect of the present invention, there is provided a multi-component force measurement spindle unit of a tire testing machine. The multi-component force measurement spindle unit includes: a spindle shaft capable of mounting a tire thereon; an inner sleeve that rotatably supports the spindle shaft via a bearing part; an outer sleeve arranged on an outside of the inner sleeve along an axial center direction of the spindle shaft; a multi-component force measurement sensor that connects an end of the inner sleeve and an end of the outer sleeve to each other and is capable of measuring a load acting on the outer sleeve from the inner sleeve; and a cooling part that cools the inner sleeve.

DESCRIPTION OF THE PREFERRED EMBODIMENTS

A description will be given of the embodiments of the present invention using a rolling resistance testing machine as an example. Note that in the following description, the same parts are denoted by the same symbols and the names and the functions of these parts are the same. Accordingly, a detailed description of the parts will not be duplicated below.

First Embodiment

Figure 1A:
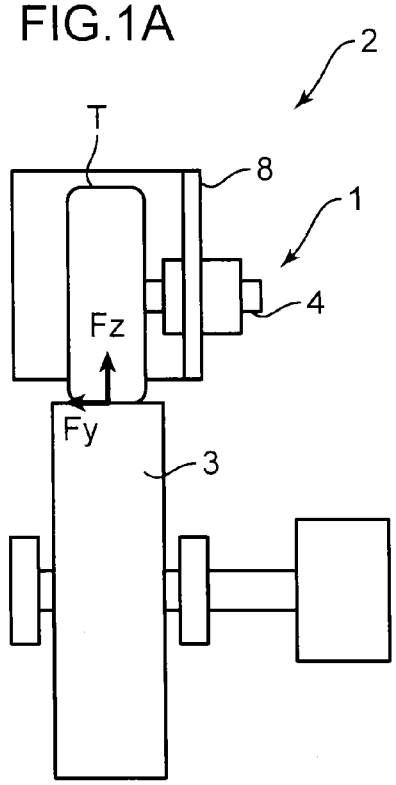
FIG. 1A is a front view of a tire testing machine having a multi-component force measurement spindle unit according to a first embodiment.
Figure 1B:
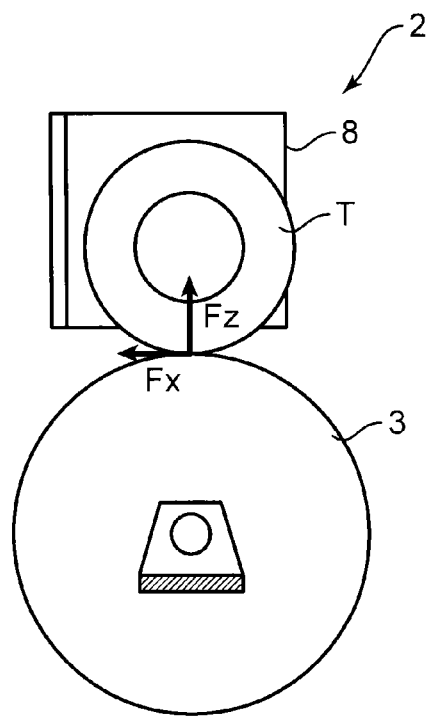
FIG. 1B is a side view of the tire testing machine.

FIGS. 1A and 1B schematically show a tire testing machine 2 where a multi-component force measurement spindle unit 1 according to the embodiment is provided.

The tire testing machine 2 has a cylindrical rotation drum 3 that rotates with a motor, etc. In addition, the tire testing machine 2 has a spindle shaft 4 to which a tire T is attached and has the multi-component force measurement spindle unit 1 that rotatably supports the spindle shaft 4 and measures loads and moments. The tire testing machine 2 brings the tire T attached to the spindle shaft 4 into contact with the rotating rotation drum 3 to measure the dynamic characteristics of the tire T in a traveling state such as the rolling resistance of the tire T.

Figure 2A:
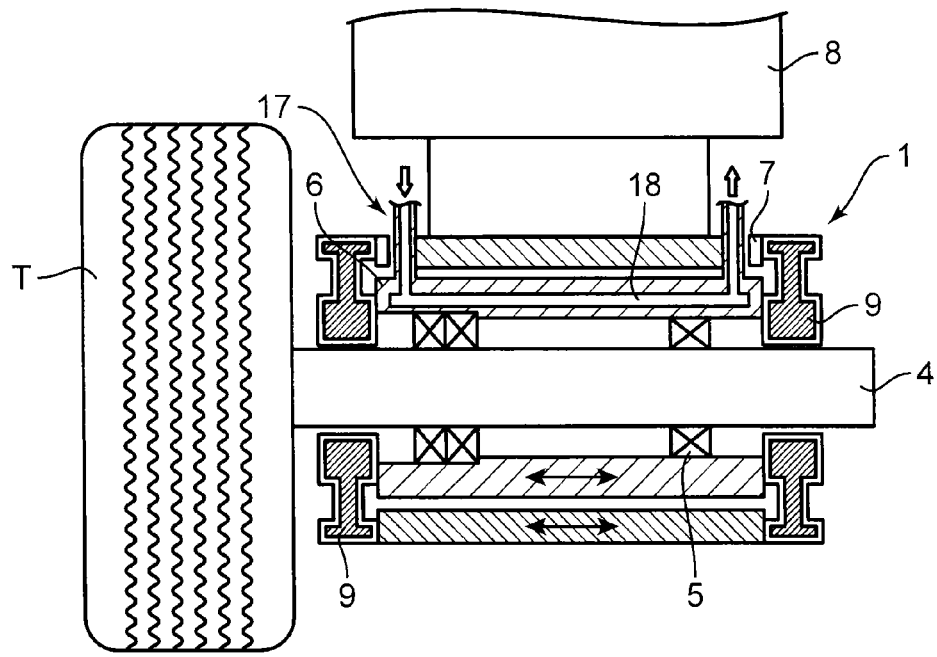
FIG. 2A is a front cross-sectional view of the multi-component force measurement spindle unit according to the embodiment.

As schematically shown in FIG. 2A, the multi-component force measurement spindle unit 1 has a cylindrical inner sleeve 6. The inner sleeve 6 rotatably supports the spindle shaft 4 via bearing parts 5. In addition, an outer sleeve 7 is provided so as to cover the outside of the inner sleeve 6. The outer sleeve 7 is arranged along the axial center direction of the spindle shaft 4 and has a column-like hole concentric to the inner sleeve 6. The outer sleeve 7 is connected to a support frame 8 that supports the multi-component force measurement spindle unit 1 itself with respect to a base substance frame (not shown), etc. Moreover, the multi-component force measurement spindle unit 1 has a pair of multi-component force measurement sensors 9 provided (fixed) at the both ends of the inner sleeve 6 and the outer sleeve 7. The pair of multi-component force measurement sensors 9 connects the end of the inner sleeve 6 and the end of the outer sleeve 7 to each other and measures loads acting on the outer sleeve 7 from the inner sleeve 6, i.e., various loads acting on the tire T.

Note that in the tire testing machine 2 arranged as shown in FIG. 1B, the right-and-left direction (traveling direction x of the tire) on paper represents a right-and-left direction used for describing the multi-component force measurement spindle unit 1. In addition, in the tire testing machine 2 shown in FIG. 1B, the penetrating direction on paper (direction y along the shaft of the tire) represents a front-and-rear direction used for describing the multi-component force measurement spindle unit 1. Moreover, in the tire testing machine 2 shown in FIG. 1B, the upper-and-lower direction (pressing direction z of the tire with respect to the rotation drum) on paper represents an upper-and-lower direction used for describing the multi-component force measurement spindle unit 1.

Next, a description will be individually given of the spindle shaft 4, the inner sleeve 6, the outer sleeve 7, the support frame 8, the bearing parts 5, and the multi-component force measurement sensors 9 that constitute the multi-component force measurement spindle unit 1 according to the embodiment.

FIG. 2A schematically shows the multi-component force measurement spindle unit 1 according to the embodiment of the present invention. In FIG. 2A, paths for supplying and discharging a cooling medium to and from a cooling medium path 18 are drawn upward for the sake of convenience.

Figure 2B:
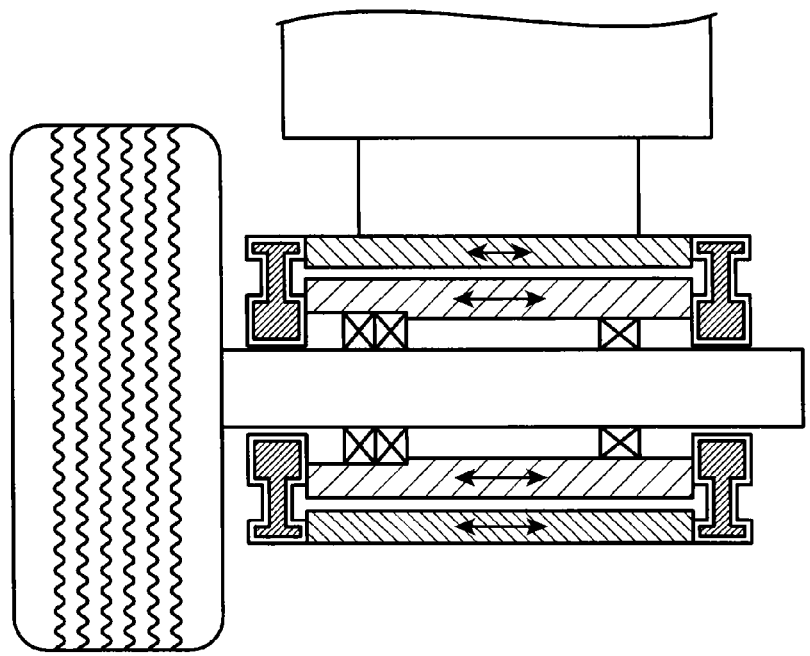
FIG. 2B is a front cross-sectional view of a multi-component force measurement spindle unit in the related art.

FIG. 2B schematically shows a multi-component force measurement spindle unit in the related art.

As shown in FIG. 2A, the multi-component force measurement spindle unit 1 according to the first embodiment has the long and rod-like spindle shaft 4 whose axial center is directed to the horizontal direction. The tire T is attached to the one end side (left side in FIG. 2A) of the spindle shaft 4 via a rim (not shown). The spindle shaft 4 is rotatable with respect to the inner sleeve 6.

The inner sleeve 6 is formed into a cylindrical shape whose axial center is directed to the horizontal direction. The spindle shaft 4 is inserted in the inner sleeve 6 with the axial center thereof directed to the horizontal direction. A plurality of bearings (bearing parts 5) rotatably supporting the spindle shaft 4 with respect to the inner sleeve 6 is provided between the inner sleeve 6 and the spindle shaft 4 inserted in the inner sleeve 6. That is, in the multi-component force measurement spindle unit 1, the plurality of bearing parts 5 is provided side by side along the axial center direction at an intermediate area in the longitudinal direction of the spindle shaft 4. The spindle shaft 4 is rotatably supported by the inner sleeve 6 via the plurality of bearings (bearing parts 5).

The outer sleeve 7 is attached on the outer periphery side of the inner sleeve 6 in an overcoating manner (so as to surround the inner sleeve 6 in the peripheral direction thereof). The outer sleeve 7 supports the inner sleeve 6 via the multi-component force measurement sensors 9 that will be described below. The outer sleeve 7 is a cylindrical member arranged on the outer periphery side of the inner sleeve 6. The outer sleeve 7 is arranged with the axial center thereof directed to the horizontal direction such that the column-like hole formed inside the outer sleeve 7 is concentric to the inner sleeve 6. The outer sleeve 7 is capable of accommodating the inner sleeve 6 therein. In the axial center direction of the outer sleeve 7, the outer sleeve 7 is substantially the same in length as the inner sleeve 6. Therefore, in a state where the inner sleeve 6 is accommodated inside the outer sleeve 7, the both ends of the inner sleeve 6 are substantially the same in position as those of the outer sleeve 7 in the axial center direction. The ends of the inner sleeve 6 and the outer sleeve 7 provided at the same positions in the axial center direction are connected to each other by the multi-component force measurement sensors 9 that will be described below.

The support frame 8 supporting the outer sleeve 7 is provided on the upper side of the outer sleeve 7. Not only the outer sleeve 7, but also the inner sleeve 6, the spindle shaft 4, the multi-component force measurement sensors 9, etc., that are connected to the outer sleeve 7 are supported by the support frame 8 in a state of being suspended from the base substance frame.

Figure 3:
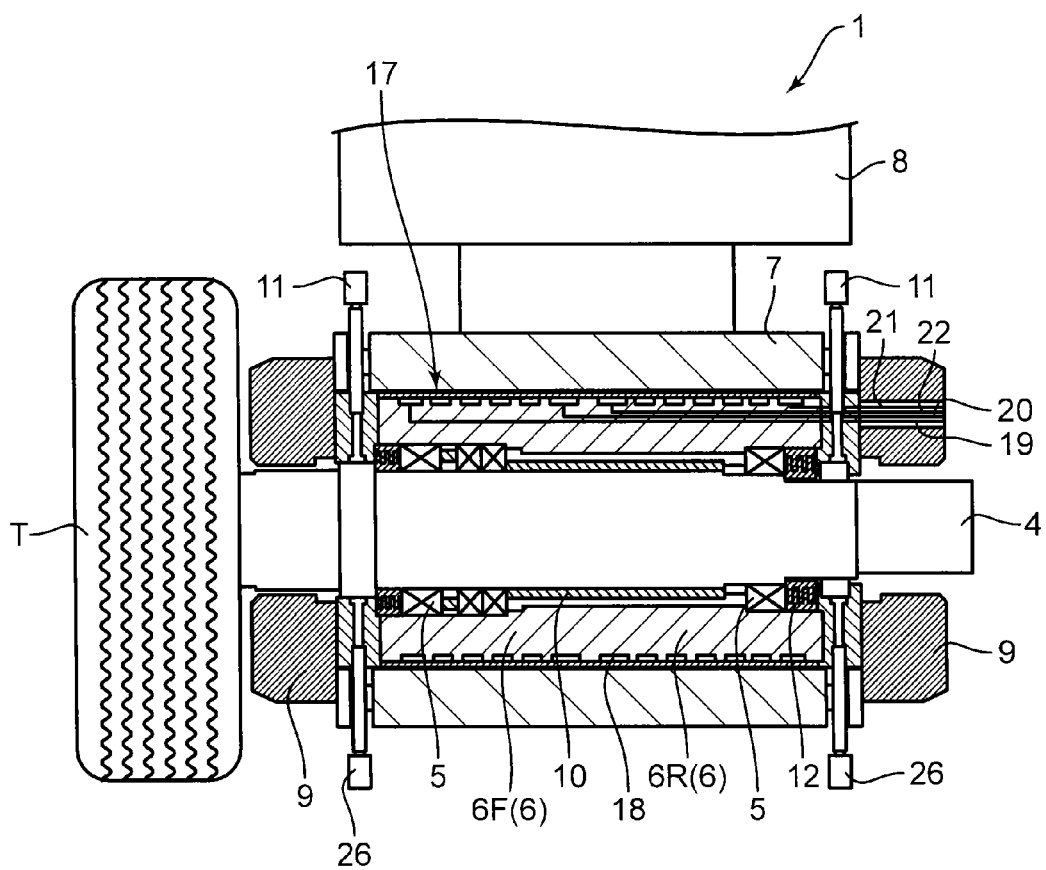
FIG. 3 is a magnified cross-sectional view of the multi-component force measurement spindle unit as seen from the front side thereof.
Figure 5:
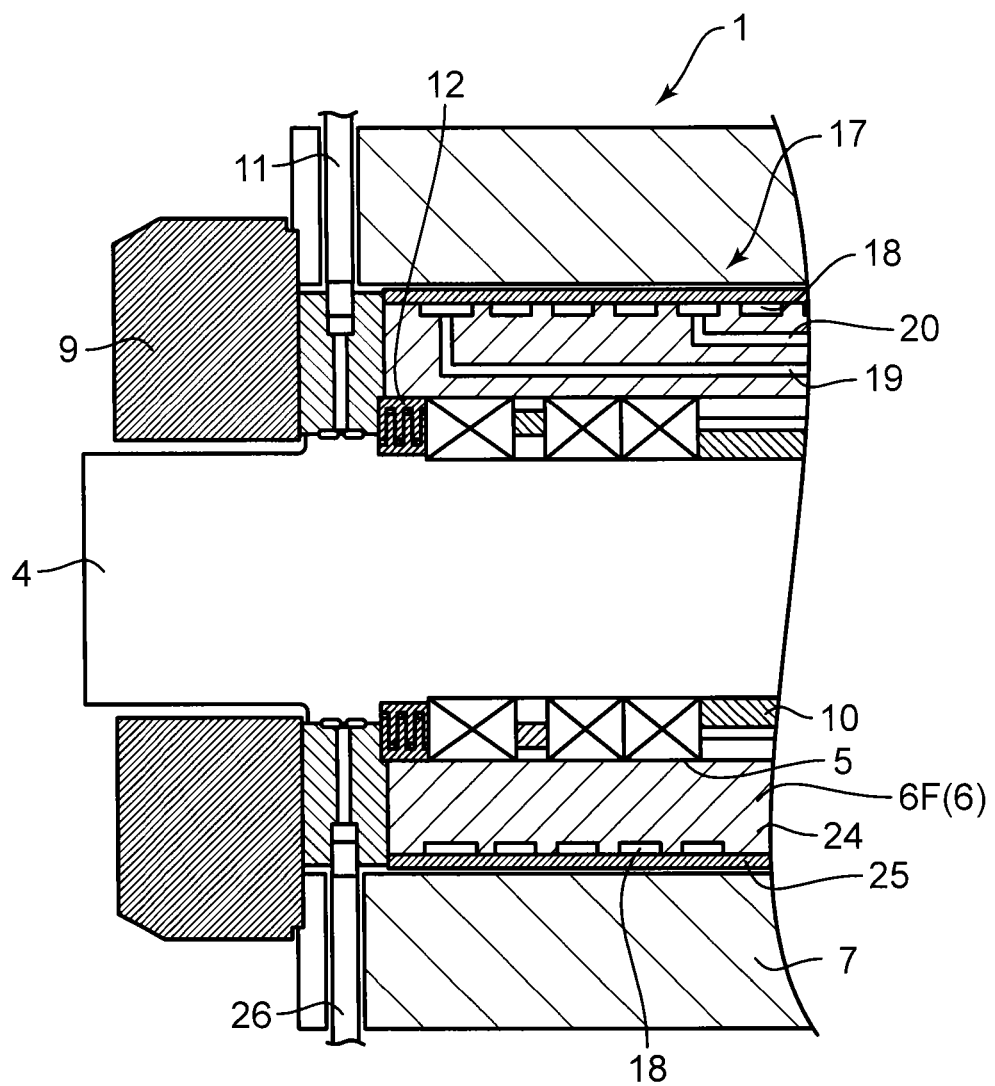
FIG. 5 is a front cross-sectional view showing the end of the multi-component force measurement spindle unit on the side of a tire under magnification.

FIG. 3 shows the cross-sectional structure of the multi-component force measurement spindle unit 1 shown in FIG. 2A in more detail. FIG. 5 shows the cross-sectional structure of the front part (on the side of the tire) of the multi-component force measurement spindle unit 1 under magnification.

As shown in FIG. 3, the plurality of bearing parts 5 is allowed to receive loads in the radial direction and/or the thrust direction. In the multi-component force measurement spindle unit 1 according to the embodiment, the four bearing parts 5 are provided. The four bearing parts 5 are arranged side by side with a predetermined interval therebetween along the axial center direction (y-direction) of the spindle shaft 4. In addition, the four bearing parts 5 are separately arranged on the both end sides in the front-and-rear direction of the inner sleeve 6. Spacers 10 are arranged between the respective bearing parts 5. With the spacers 10, the respective bearing parts 5 are set at predetermined places along the axial center direction.

As shown in FIGS. 3 and 5, air pipes 11 are provided on the both end sides in the front-and-rear direction of the inner sleeve 6 and the outer sleeve 7 so as to penetrate the outer sleeve 7 and the inner sleeve 6 from the outside to the inside of the outer sleeve 7 in the radial direction. In addition, non-contact seals 12 (labyrinth seals) are individually provided on the central side closer to the axial center direction than the air pipes 11. The non-contact seals 12 seal lubricating oil without contacting the front surface of the spindle shaft 4. The non-contact seals 12 can eliminate measurement errors resulting from changes in seal resistance associated with changes in the temperature of sealing parts occurring when contact seals are used. The air pipes 11 introduce high-pressure air from the outside of the outer sleeve 7 to the area between the spindle shaft 4 and the inner sleeve 6 and cause the same to act on the non-contact seals 12. With the actions of the high-pressure air and the non-contact seals 12, leakage of the lubricating oil supplied to the bearing parts 5 to the outside can be prevented.

Note that the multi-component force measurement spindle unit 1 may have oil collection paths (not shown) that collect the lubricating oil supplied to the bearing parts 5 or oil collection paths 26 shown in FIGS. 3 and 5 that are connected to a suction part (not shown) operated as necessary and collect the lubricating oil unintentionally leaked from the non-contact seals 12.

The multi-component force measurement sensors 9 (e.g., load cells according to the embodiment) are arranged so as to be laid across the ends of the inner sleeve 6 and the outer sleeve 7. Specifically, the multi-component force measurement sensor 9 on the front side is arranged so as to connect the front end of the inner sleeve 6 and the front end of the outer sleeve 7 to each other. In addition, the multi-component force measurement sensor 9 on the rear side is arranged so as to connect the rear end of the inner sleeve 6 and the rear end of the outer sleeve 7 to each other. The installation direction of the multi-component force measurement sensor 9 on the front side is opposite to that of the multi-component force measurement sensor 9 on the rear side, but the multi-component force measurement sensors on the front and the rear sides have substantially the same structure (see FIGS. 4A and 4B).

Figure 4A:
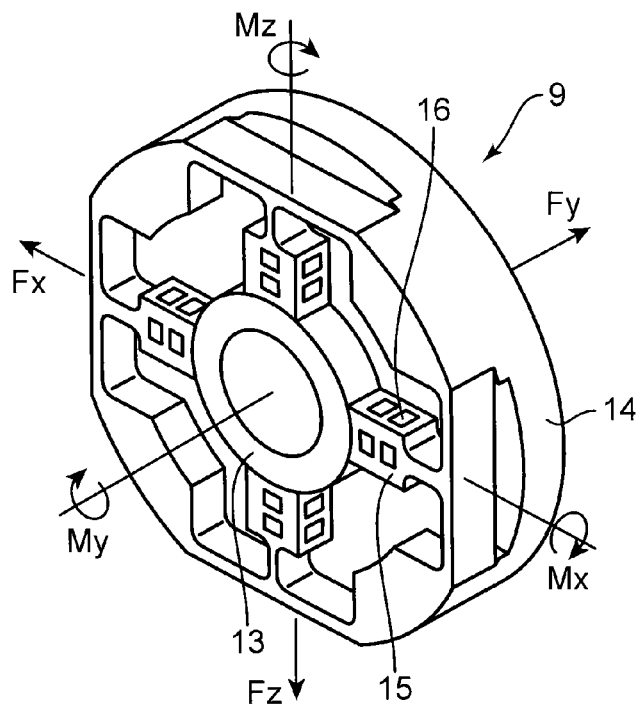
FIG. 4A is a perspective view of a multi-component force measurement sensor.

As shown in FIG. 4A, the multi-component force measurement sensor 9 according to the first embodiment has a substantially disc-like appearance. The multi-component force measurement sensor 9 has a force applied body 13, a fixed body 14, and strain elements 15 that connect the force applied body 13 and the fixed body 14 to each other.

The multi-component force measurement sensor 9 has the ring-shaped force applied body 13 at the center part thereof. The spindle shaft 4 penetrates the center of the opening of the ring-shaped force applied body 13 in a loosely fitted state.

The ring-shaped fixed body 14 having a larger inner diameter than the outer diameter of the force applied body 13 is arranged on the outside of the diameter of the force applied body 13. The force applied body 13 and the fixed body 14 are arranged so as to be coaxial to each other. The force applied body 13 on the inner periphery side of the multi-component force measurement sensor 9 and the fixed body 14 on the outer periphery side thereof are connected to each other by the plurality of strain elements 15. In the multi-component force measurement sensor 9 according to the embodiment, the strain elements 15 radially extend in the radial direction from the force applied body 13. Specifically, the strain elements 15 extend in the four directions of upward, downward, rightward, and leftward directions, and are each formed into a square-bar-like shape. That is, the four strain elements 15 are provided around the axial center of the spindle shaft 4.

The force applied body 13 of the multi-component force measurement sensor 9 and the end edge of the inner sleeve 6 are firmly fixed by fixing tools (not shown) such as bolts, and forces transmitted in the order of the spindle shaft 4, the bearing parts 5, and the inner sleeve 6 are transmitted to the force applied body 13. In addition, fixing tools (not shown) such as bolts are also provided in the fixed body 14 of the multi-component force measurement sensor 9 and the end edge of the outer sleeve 7 to firmly fix the fixed body 14 to the end edge of the outer sleeve 7. Forces (various loads acting on the tire) transmitted from the spindle shaft 4 to the outer sleeve 7 are measured based on strains caused in the strain elements 15 provided in the middle of the transmission path.

As shown in FIG. 4A, the respective strain elements 15 have a thin part that is made thinner. When forces act between the force applied body 13 and the fixed body 14, the strain elements 15 are deformed with the thin parts as starting points. In addition, strain gauges 16 capable of detecting forces and moments are attached to the respective strain elements 15. The strain gauges 16 include those that are attached to the side closer to the force applied body 13 and measure translational loads, and include those that are attached to the side closer to the fixed body 14 and measure moments.

That is, with the multi-component force measurement sensors 9 arranged on the both ends of the inner sleeve 6 (and the outer sleeve 7), the multi-component force measurement spindle unit 1 according to the embodiment of the present invention can measure the six component forces of the translational loads (Fx, Fy, and Fz) in the x, y, and z directions and the moments (Mx, My, and Mz) around the x, y, and z axes.

Figure 4B:
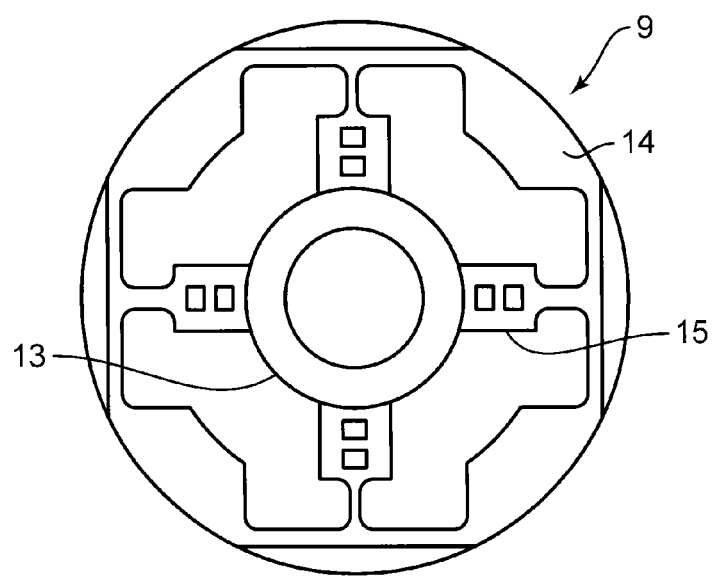
FIG. 4B is a side view of the multi-component force measurement sensor.

In the rolling resistance testing machine, the rolling resistance (translational load in the z-direction) Fx out of the six component forces is particularly important for evaluating the characteristics of the tire T. Therefore, in the multi-component force measurement sensor 9 according to the embodiment, the strain elements 15 extending in the upward-and-downward direction are thinner than the strain elements 15 extending in the rightward-and-leftward direction as shown in FIGS. 4A and 4B. Thus, compared with a case where all the strain elements 15 are the same and thick as in the related art, the strain elements 15 extending in the upward-and-downward direction are easily deformed even with small loads applied in the x-direction. Therefore, the rolling resistance testing machine according to the embodiment can measure the rolling resistance Fx at a high sensitivity.

Analog signals output from the strain gauges 16 of the strain elements 15 are input to an amplifier (not shown) arranged near the multi-component force measurement sensors 9 so as not to have noise superimposed thereon. Then, the signals are amplified and A/D-converted. After that, a processing part (personal computer) connected to the amplifier calibrates the A/D-converted signals using a calibration formula such as a calibration matrix to calculate the rolling resistance Fx.

Meanwhile, as the tire testing machine 2, there is one that runs tests under severe testing conditions such as a case where camber angles or pressing loads are large and a case where controlling or driving is required. In such a tire testing machine 2, there is a likelihood that large loads (forces or moments) in a bending direction are added to a spindle shaft. Therefore, such a tire testing machine 2 employs a configuration, where an inner sleeve (spindle shaft) is firmly supported by multi-component force measurement sensors (e.g., load cells according to the embodiment) 9 at two front and rear parts, so as to be capable of supporting large loads.

In addition, bearing parts rotatably supporting the spindle shaft are provided between the inner sleeve and the spindle shaft. Heat is generated in the bearing part with the rotation of the spindle shaft, and the generated heat is transmitted to both the inner sleeve and the outer sleeve. The inner sleeve and the outer sleeve are expanded by the heat thus transmitted. The expanded states of the inner sleeve and the outer sleeve are different, and the difference between the expanded states acts on both the multi-component force measurement sensors as strains. That is, in the spindle unit in the overconstrained state as described above, the strains resulting from the difference between the expanded state of the inner sleeve and that of the outer sleeve are caused in the multi-component force measurement sensors, and measurement errors corresponding to the strains are added to the measurement values of loads and moments. Because of this, it is difficult to accurately measure the loads and the moments produced in a tire.

In view of this, the multi-component force measurement spindle unit 1 according to the embodiment has a cooling part 17 that cools a predetermined area of the inner sleeve 6 in the axial direction.

Specifically, as schematically shown in FIG. 2A, the cooling part 17 supplies a cooling medium to the inner sleeve 6 to directly cool the inner sleeve 6 from the inside. The cooling medium flows through the cooling medium path 18 that is provided on the outer peripheral surface side of the inner sleeve 6 and spirally formed along the axial direction. More specifically, the cooling medium flows through the cooling medium path 18 that is formed on the outer peripheral surface side of the inner sleeve 6 so as to circle around the axial center of the inner sleeve 6 multiple times, and cools the inner sleeve 6 itself.

Hereinafter, a description will be given of the cooling part 17 and the cooling medium path 18 constituting the cooling part 17 according to the first embodiment.

As shown in FIG. 3, in the multi-component force measurement spindle unit 1 according to the first embodiment, the inner sleeve 6 has the two cooling medium paths 18 that have substantially the same installation length in the axial center direction and are different in system between the front side and the rear side of the inner sleeve 6.

That is, the two cooling medium paths 18 are independently formed on the front side (inner sleeve front part 6F) and the rear side (inner sleeve rear part 6R) of the inner sleeve 6.

For example, in the inner sleeve front part (hereinafter simply referred to as front part) 6F, spiral grooves are formed so as to circle around the outer peripheral surface along the axial center direction (from the front end side to the rear end side of the front part 6F). The spiral grooves are successively formed as a single line from the front end side to the rear end side of the front part 6F without crossing each other. The spiral grooves as a single line form the cooling medium path 18. Note that the spiral grooves forming the cooling medium path 18 are not limited to a single line but may be formed of two or more lines. In addition, the cooling medium path 18 may be provided at any position along the outer peripheral surface so long as the cooling medium path 18 cools a predetermined area of the front part 6F in the axial direction thereof, but has to be provided at the position at which the bearing parts 5 arranged in the front part 6F are surrounded.

One end (front end) of the cooling medium path 18 formed along the outer peripheral surface of the front part 6F is connected to a communication path (first communication path 19) that passes through the inside of the front part 6F. The communication path 19 penetrates the inside of the front part 6F along the axial center direction and is connected to the outside. Similarly, the other end (rear end) of the cooling medium path 18 of the front part 6F is connected to a communication path (second communication path 20) that passes through the inside of the front part 6F. The second communication path 20 is a path different from the first communication path 19, penetrates the inside of the front part 6F along the axial center direction, and is connected to the outside.

The cooling medium introduced into the front part 6F via the first communication path 19 reaches the front end of the cooling medium path 18 and then flows through the cooling medium path 18. Thus, the cooling medium circles around the vicinity of the front surface of the front part 6F to cool a predetermined area in the axial direction of the front part 6F from the outer peripheral surface side of the inner sleeve 6. The cooling medium reaching the rear end of the cooling medium path 18 is discharged to the outside of the front part 6F via the second communication path 20. The cooling medium may be introduced in the direction opposite to the above, i.e., it may be introduced in the order of the second communication path 20, the cooling medium path 18, and the first communication path 19.

On the other hand, the configuration of the cooling medium path 18 formed at the outer peripheral surface of the inner sleeve rear part (hereinafter simply referred to as rear part) 6R and the flowing mode of the cooling medium are substantially the same as those of the front part 6F.

That is, in the rear part 6R, spiral grooves are formed at the outer peripheral surface from the rear end side to the front end side of the rear part 6R. The spiral grooves as a single line constitute the cooling medium path 18. The front end and the rear end of the cooling medium path 18 formed on the outer peripheral surface side of the rear part 6R are connected to the outside by communication paths (third communication path 21 and fourth communication path 22) that pass through the inside of the rear part 6R.

The cooling medium introduced into the rear part 6R via the third communication path 21 reaches the rear end of the cooling medium path 18 and then flows through the cooling medium path 18. Thus, the cooling medium circles around the vicinity of the front surface of the rear part 6R to cool a predetermined area in the axial direction of the rear part 6R from the outer peripheral surface side of the inner sleeve 6. The cooling medium reaching the front end of the cooling medium path 18 is discharged to the outside of the rear part 6R via the fourth communication path 22. The cooling medium may be introduced in the direction opposite to the above.

Note that in order to form the spiral cooling medium paths 18 on the outer peripheral surface side of the inner sleeve 6, the following process is, for example, required.

That is, as shown in FIG. 5, the inner sleeve 6 is constructed using a cylindrical inner sleeve main body 24 and a cylindrical and thin outer shell body 25 that surrounds the inner sleeve main body 24. Then, the spiral and circling-around grooves are formed at the outer peripheral surface of the inner sleeve main body 24 along the axial center direction. The width, depth, pitch, etc, of the grooves formed at this time are appropriately changed in accordance with the size and the cooling performance of the inner sleeve 6. Subsequently, the outer shell body 25 is fitted in the inner sleeve main body 24 to cover the openings of the grooves. On this occasion, a seal member that seals the ends of the inner sleeve main body 24 and the outer shell body 25 may be provided between the inner sleeve main body 24 and the outer shell body 25 where necessary. In addition, the outer shell body 25 may be welded to the inner sleeve main body 24 to seal the ends of the inner sleeve main body 24 and the outer shell body 25. In the manner described above, the cooling medium paths 18 are formed along the outer peripheral surface (exactly, the inside right below the front surface) of the inner sleeve 6.

Further, the coolant of an organic compound such as an alternative CFC (chlorofluorocarbon) is used as the cooling medium that flows through the cooling medium paths 18. Instead of the coolant of an organic compound, water or oil may be used. The cooling medium is cooled by a cooling apparatus (not shown) provided outside the tire testing machine 2, etc., and supplied to the cooling medium paths 18.

Causing the cooling medium to flow through the spiral cooling medium paths 18 formed at the outer peripheral surface of the inner sleeve 6 as described above makes it possible to uniformly cool the inner sleeve 6 over the whole area in the axial direction and the periphery direction. As a result, it becomes possible to prevent only the temperature of the inner sleeve 6 from being higher than that of the outer sleeve 7 and make the length of the inner sleeve 6 be substantially the same as that of the outer sleeve 7 in the axial direction. That is, there is no difference in extending amount along the axial center direction between the inner sleeve 6 and the outer sleeve 7. Because of this, strains (internal forces) based on the difference in extending amount do not act on the multi-component force measurement sensors 9 as error components. Therefore, a reduction in the accuracy of the multi-component force measurement sensors 9 due to the heat generated in the bearing parts 5 is also prevented. In other words, the accuracy of the multi-component force measurement sensors 9 can be improved by performing predetermined cooling on the inner sleeve 6 rather than positively cooling the heated bearing parts with lubricating oil.

Particularly in the multi-component force measurement spindle unit 1 that employs the support structure where the inner sleeve 6 and the outer sleeve 7 are overconstrained by the multi-component force measurement sensors 9 provided at the two front and rear parts, when the rolling resistance Fx is measured using the multi-component force measurement sensors 9 that measure the Fx at a high sensitivity with the strain elements 15 extending in the upward-and-downward direction being thinner than the strain elements 15 extending in the rightward-and-leftward direction, there is a likelihood that the inner sleeve 6 is thermally expanded by the heat generated in the bearing parts 5 and measurement accuracy is remarkably reduced. Therefore, it is preferable to provide the cooling part 17 in the multi-component force measurement spindle unit 1.

In addition, the cooling medium paths 18 divided into two in the axial direction are provided at the front part (inner sleeve front part) 6F and the rear part (inner sleeve rear part) 6R of the inner sleeve 6, and the cooling medium is separately supplied to the independent cooling medium paths 18. Thus, it becomes possible to independently cool the inner sleeve front part 6F and the inner sleeve rear part 6R in accordance with the conditions of the heat generated in the inner sleeve 6. For example, there may be a case that the heat generated in the inner sleeve front part 6F becomes larger than that generated in the inner sleeve rear part 6R depending on the distribution of the forces applied to the spindle shaft 4 and the arrangement of the bearing parts 5. In this case, the amount of the cooling medium flowing through the inner sleeve front part 6F is made larger than that of the cooling medium flowing through the inner sleeve rear part 6R, whereby the front side of the inner sleeve 6 where the heat is generated in large amounts can be effectively cooled. As a result, it becomes possible to more reliably prevent a reduction in the accuracy of the multi-component force measurement sensors 9.

Second Embodiment

Next, a description will be given of the multi-component force measurement spindle unit 1 according to a second embodiment.

Figure 6:
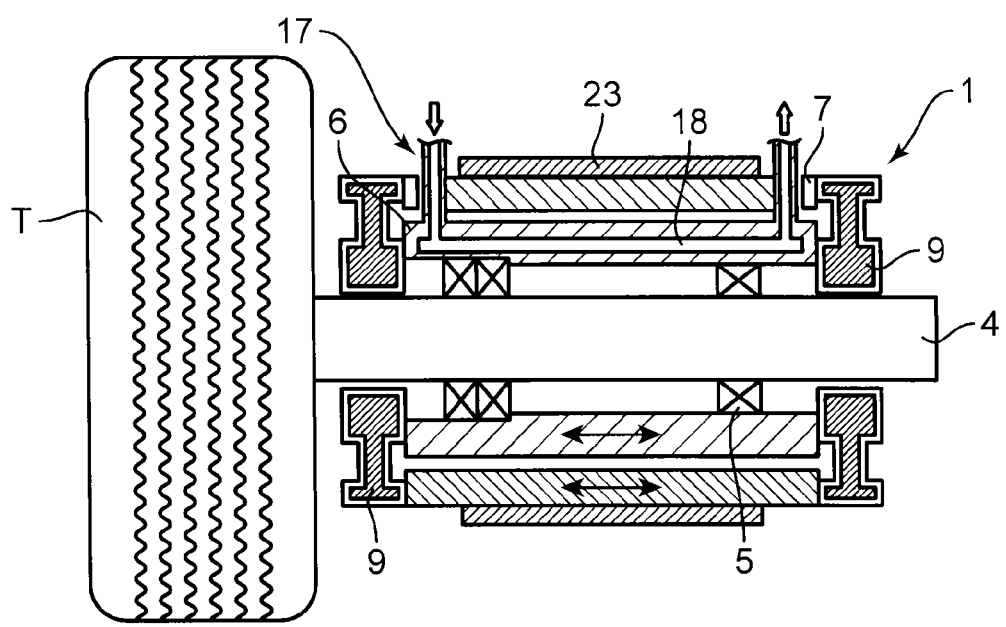
FIG. 6 is a front cross-sectional view of the multi-component force measurement spindle unit according to a second embodiment.

As schematically shown in FIG. 6, the feature of the multi-component force measurement spindle unit 1 according to the second embodiment is that a temperature rising part 23 that rises the temperature of the outer sleeve 7 is provided in the outer sleeve 7 to reduce a difference in temperature between the outer sleeve 7 and the inner sleeve 6.

In terms of other configurations, the multi-component force measurement spindle unit 1 according to the second embodiment is substantially the same as the multi-component force measurement spindle unit 1 according to the first embodiment. The cooling medium path 18 (cooling part 17) that cools a predetermined area of the inner sleeve 6 in the axial direction is provided in the inner sleeve 6. Note that in FIG. 6, paths for supplying and discharging the cooling medium to and from the cooling medium path 18 are drawn upward for the sake of convenience.

As shown in FIG. 6, the temperature rising part 23 provided in the outer sleeve 7 according to the second embodiment has a heating unit that directly heats the outer sleeve 7. In addition, the temperature rising part 23 may have a heat insulation unit that covers the outer peripheral surface of the outer sleeve 7 to prevent heat from spreading (flowing) from the inside to the outside of the outer sleeve 7.

The heating unit of the temperature rising part 23 (of a heating type) has a heater formed into a sheet shape such as a rubber heater and a ribbon heater. Such a heater can be attached to the outer sleeve 7 so as to be wound around the outer peripheral surface of the outer sleeve 7. Such a heater positively heats the outer sleeve 7 from the outside to hold the outer sleeve 7 at a predetermined temperature.

The heat insulation unit of the temperature rising part 23 (of a heat insulation type) is composed of a heat insulation material, etc., formed into a sheet shape. Such a heat insulation material can also be attached to the outer sleeve 7 so as to be wound around the outer peripheral surface of the outer sleeve 7. Such a heat insulation material reduces the amount of the heat flowing from the outer sleeve 7 to the outside to hold the temperature of the outer sleeve 7 at a predetermined state.

Holding the temperature of the outer sleeve 7 at a predetermined state by the temperature rising part 23 as described above makes it possible to further reduce a difference in temperature between the inner sleeve 6 and the outer sleeve 7. In addition, it becomes also possible to lessen the influence of an outside air temperature.

For example, it is assumed that heat generated in the bearing parts 5 is larger than expected. In this case, it is difficult to sufficiently reduce the temperature of the inner sleeve 6 even if the inner sleeve 6 is cooled using the cooling part 17. Therefore, there may be a case that the temperature of the inner sleeve 6 becomes slightly higher than that of the outer sleeve 7.

In this case, the temperature of the outer sleeve 7 can get close to that of the inner sleeve 6 in such a manner that the outer sleeve 7 is heated by the temperature rising part 23 of a heating type and held at a predetermined temperature. Thus, a difference in extending amount along the axial center direction hardly occurs between the outer sleeve 7 and the inner sleeve 6, whereby a reduction in the accuracy of the multi-component force measurement sensors 9 can be more reliably prevented.

Note that in reducing the difference in temperature between the outer sleeve 7 and the inner sleeve 6 by the temperature rising part 23, it is preferable to provide a temperature measurement part, etc., in both the outer sleeve 7 and the inner sleeve 6 and control the cooling part 17 and/or the temperature rising part 23 of a heating type based on the temperature of the outer sleeve 7 and that of the inner sleeve 6 measured by the temperature measurement part.

Third Embodiment

Next, a description will be given of the multi-component force measurement spindle unit 1 according to a third embodiment.

The multi-component force measurement spindle unit 1 according to the embodiment is capable of measuring the rolling resistance of a tire. The multi-component force measurement spindle unit 1 according to the embodiment has one multi-component force measurement sensor 9.

In the embodiment, a member corresponding to the inner sleeve 6 according to the first embodiment is called a housing 36. In addition, a constituent corresponding to the outer sleeve 7 according to the first embodiment and a constituent corresponding to the support frame 8 according to the first embodiment are collectively called a support member 37.

Figure 7:
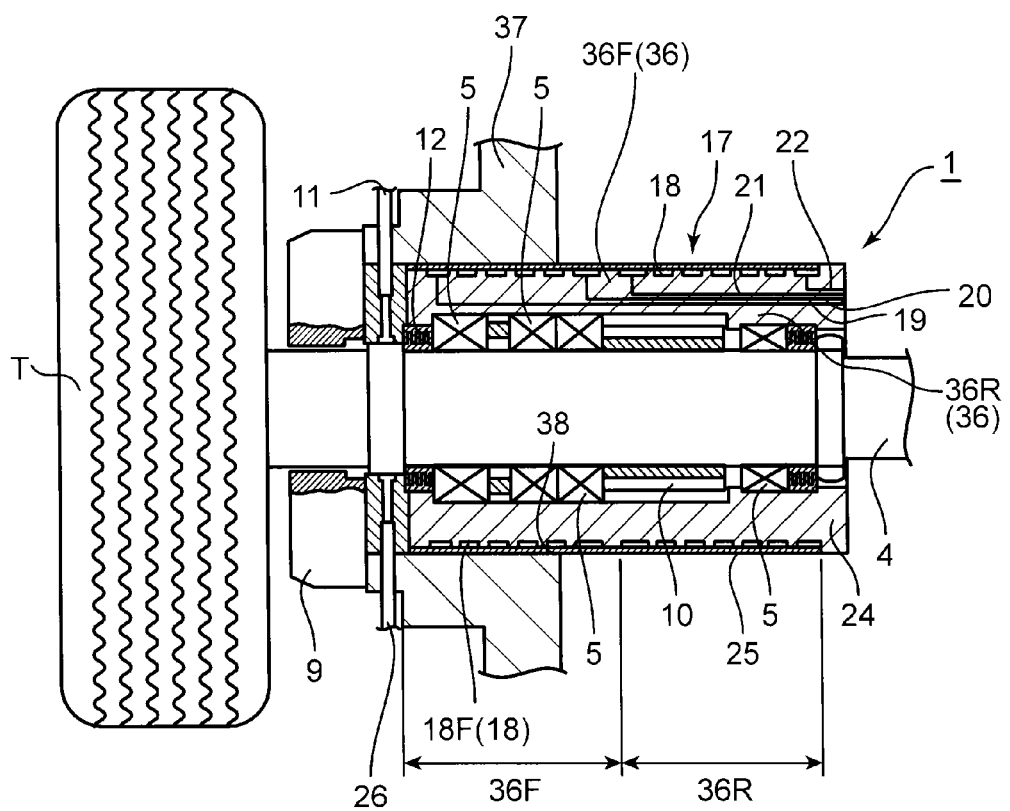
FIG. 7 is a front cross-sectional view of the multi-component force measurement spindle unit according to a third embodiment.

FIG. 7 schematically shows the multi-component force measurement spindle unit 1 according to the embodiment.

As shown in FIG. 7, the multi-component force measurement spindle unit 1 according to the embodiment has the long and rod-like spindle shaft 4 whose axial center is directed to the horizontal direction. The tire T is attached to the one end side (left side in FIG. 7) of the spindle shaft 4 via a rim (not shown). The spindle shaft 4 is rotatable with respect to the housing 36.

The housing 36 is formed into a cylindrical shape whose axial center is directed to the horizontal direction. In the housing 36, the spindle shaft 4 is inserted with the axial center thereof directed to the horizontal direction. The plurality of bearings (bearing parts 5) is provided between the housing 36 and the spindle shaft 4 inserted in the housing 36. The plurality of bearing parts 5 supports the spindle shaft 4 so as to be rotatable with respect to the housing 36. That is, in the multi-component force measurement spindle unit 1, the plurality of bearing parts 5 is arranged side by side along the axial center direction at an intermediate part of the spindle shaft 4 in the longitudinal direction thereof. The spindle shaft 4 is rotatably supported by the housing 36 via the plurality of bearing parts 5.

The support member 37 that supports the housing 36 via the multi-component force measurement sensor 9 that will be described below is provided on the outer periphery side of the housing 36. The support member 37 according to the embodiment has a cylindrical member that includes an accommodation part 38 capable of accommodating the housing 36 and where the multi-component force measurement sensor 9 is fixed, and has a substantially plate-like member vertically and horizontally extending from the cylindrical member. The support member 37 may be one where a plurality of members is combined together as described above or may be a single-piece substance. In the embodiment, the accommodation part 38 is configured to surround the column-like hole thereof whose axial center is directed to the horizontal direction so as to be coaxial to the housing 36 and configured to be capable of accommodating the housing 36 in a state where the axial center of the hole is directed to the horizontal direction.

As shown in FIG. 7, the plurality of bearing parts 5 is allowed to receive loads in the radial direction and/or the thrust direction. In the multi-component force measurement spindle unit 1 according to the embodiment, the four bearing parts 5 are provided. The four bearing parts 5 are arranged side by side with a predetermined interval therebetween in the axial direction (y-direction) of the spindle shaft 4 and separately provided on both sides in the front-and-rear direction of the housing 36. The spacers 10 with which the bearing parts 5 are set at predetermined places along the axial center direction are arranged between the respective bearing parts 5.

Figure 8:
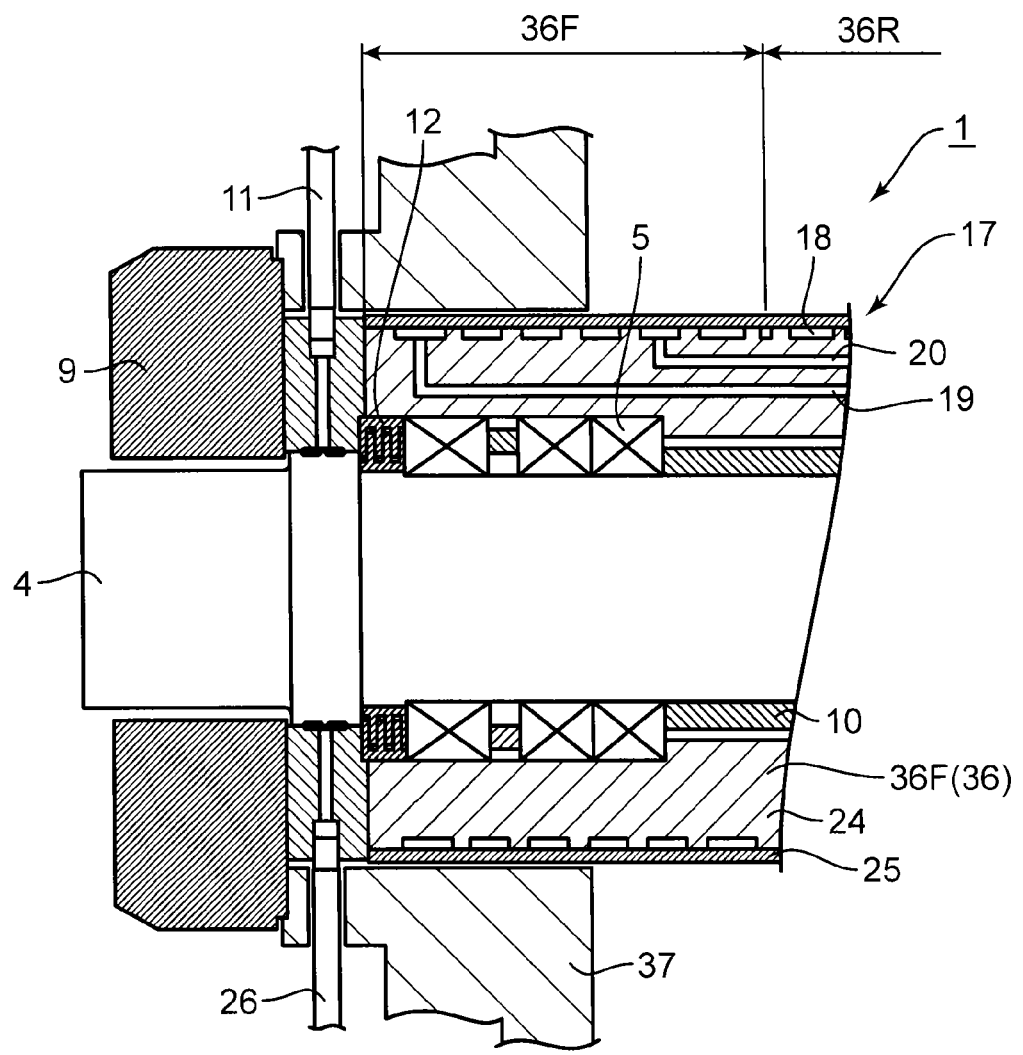
FIG. 8 is a front cross-sectional view showing the end of the multi-component force measurement spindle unit on the side of a tire according to the third embodiment under magnification.

As shown in FIG. 8 under magnification, the air pipe 11 is provided on the front end side of the housing 36 and the support member 37 so as to penetrate the support member 37 and the housing 36 from the outside of the support member 37 in the radial direction. In addition, the non-contact seal 12 (labyrinth seal) is provided on the side closer to the rear end side in the axial direction than the air pipe 11. The non-contact seal 12 seals lubricating oil without contacting the surface of the spindle shaft 4. The non-contact seal 12 can eliminate measurement errors resulting from changes in seal resistance associated with changes in the temperature of a sealing part occurring when a contact seal is used. The non-contact seal 12 (labyrinth seal) that produces the same action and effect is also provided on the rear end side of the housing 36. Further, the air pipes 11 introduce high-pressure air from the outside of the support member 37 to the area between the spindle shaft 4 and the housing 36 and cause the same to act on the non-contact seals 12. With the actions of the high-pressure air and the non-contact seals 12, leakage of the lubricating oil supplied to the bearing parts 5 to the outside can be prevented.

Note that the multi-component force measurement spindle unit 1 may have oil collection paths (not shown) that collect the lubricating oil supplied to the bearing parts 5 or the oil collection paths 26 shown in FIGS. 7 and 8 that are connected to a suction part (not shown) operated as necessary and collect the lubricating oil unintentionally leaked from the non-contact seals 12. In addition, the air pipes, the suction part, and the oil collection paths 26 that produce the same action and effect as the above may be provided on the side further closer to the rear end side of the housing 36 than the non-contact seals (labyrinth seals) 12 provided on the rear end side of the housing 36.

FIG. 8 shows the cross-sectional structure of the front part (on the side of the tire) of the multi-component force measurement spindle unit 1 under magnification.

The one multi-component force measurement sensor 9 (e.g., load cell according to the embodiment) is arranged so as to be laid across the front end surface of the housing 36 and that of the support member 37. Specifically, the multi-component force measurement sensor 9 is arranged between the front end surface of the housing 36 and that of the support member 37 so as to connect both these members to each other.

The configuration and the function of the multi-component force measurement sensor 9 according to the embodiment are the same as those of the multi-component force measurement sensors 9 according to the first embodiment.

Meanwhile, in the tire testing machine described in the above Japanese Patent Application Publication No. 2003-4598, the spindle shaft (5: the symbol in the brackets represents the corresponding symbol in this Patent Gazette) has a certain degree of length in the axial center direction. When loads are applied to one end of the spindle shaft (5) in the pressing direction (perpendicular direction) and then forces and moments, etc., are measured at the other end of the spindle shaft (5), large moments act on the multi-component force measurement sensor (4). Therefore, since the multi-component force measurement sensor (4) used in such a tire testing machine employs the thick strain elements, etc., to resist acting large moments, the multi-component force measurement sensor (4) cannot detect changes in minute force. As a result, the multi-component force measurement sensor (4) makes a sacrifice of the detection accuracy thereof.

In order to avoid such a drawback, the moments acting on the multi-component force measurement sensor (4) can be reduced in such a manner that the multi-component force measurement sensor (4) is held close to the tire T. However, if the multi-component force measurement sensor (4) is held close to the tire T where the bearing parts (10) are provided, heat generated in the bearing parts (10) and thermal deformation caused by the heat result in a reduction in the accuracy of the multi-component force measurement sensor (4). As shown in the figures according to the embodiment, in order to reduce the moments produced in the multi-component force measurement sensor 9, the plurality of bearing parts 5 can be provided inside the housing 36 on the side further apart from the tire than the multi-component force measurement sensor 9 to rotatably support the spindle shaft 4, and the cooling mechanism that circulates the lubricating oil of the bearing parts 5 to positively cool the same can be separately provided. However, it turns out from an experiment that the heat generated in the bearing parts 5 (particularly the heat generated in the bearing parts 5 on the side closer to the tire) may not be sufficiently removed even by the cooling mechanism since the heat is generated in extremely large amounts in the bearing parts 5. In addition, it turns out from an experiment that when the lubricating oil is supplied in large amounts to the bearing parts 5 to remove the heat, the lubricating oil is heated by stirring heat to spur the generation of the heat in the bearing parts 5.

Moreover, when pressing forces act on the spindle shaft 4 in the direction perpendicular to the axial center of the spindle shaft 4, heat is likely to be generated only in part in the periphery direction of the bearing parts 5 that support the spindle shaft 4. As for both the bearing parts 5 and the housing 36 surrounding the bearing parts 5, the heat thus generated only in the part in the periphery direction of the bearing parts 5 causes the part in the periphery direction to be thermally deformed (deformed particularly in the radial direction) in larger amounts than other parts in the periphery direction. As a result, the accuracy of the multi-component force measurement sensor 9 is reduced.

In view of this, the multi-component force measurement spindle unit 1 according to the embodiment has the cooling part 17 that cools a predetermined area in the periphery direction of the housing 36 to prevent part in the periphery direction of the housing 36 from being deformed in the radial direction due to the heat generated in the bearing parts 5.

Specifically, as shown in FIG. 7, the cooling part 17 supplies the cooling medium to the housing 36 from the outside to directly cool the housing 36 from the inside. The cooling medium flows through the cooling medium path 18 formed in a predetermined area in the periphery direction and the axial direction of the housing 36 along the outer peripheral surface of the housing 36. More specifically, the cooling medium flows through the cooling medium path 18 formed along the outer peripheral surface of the housing 36 so as to spirally circle around the axial center of the housing 36 multiple times, and cools the housing 36 itself such that the temperature of the housing 36 becomes uniform as much as possible over the whole area in the periphery direction and the axial direction.

Hereinafter, a description will be given of the cooling part 17 and the cooling medium path 18 constituting the cooling part 17 according to the embodiment.

As shown in FIG. 7, in the multi-component force measurement spindle unit 1 according to the embodiment, the housing 36 has the two cooling medium paths 18 that have substantially the same installation length in the axial direction and are different in system between the front side and the rear side of the housing 36.

That is, the two cooling medium paths 18 are independently formed on the front side (housing front part) 36F and the rear side (housing rear part) 36R of the housing 36.

For example, in the housing front part (hereinafter simply referred to as front part) 36F, spiral grooves 18F are formed so as to circle around the outer peripheral surface along the axial direction (from the front end side to the rear end side of the front part 36F). The spiral grooves 18F are successively formed as a single line from the front end side to the rear end side of the front part 36F without crossing each other. The spiral grooves 18F as a single line form the cooling medium path 18. Note that the spiral grooves 18F forming the cooling medium path 18 is not limited to a single line but may be formed of two or more lines. In addition, in order to prevent the end of the housing 36 on the side where the multi-component force measurement sensor 9 is fixed from being thermally deformed in the radial direction, the cooling medium path 18 may be provided at any position along the outer peripheral surface so long as the cooling medium path 18 cools the whole area in the periphery direction of the housing 36. However, the cooling medium path 18 is preferably formed at least at the position at which the bearing parts 5 arranged in the front part 36F are surrounded. More preferably, the cooling medium paths 18 are formed as different systems at the positions at which the bearing parts 5 arranged in the front part 36F and the housing rear part 36R (hereinafter simply referred to as rear part) are surrounded. Moreover, the cooling medium paths 18 formed in the front part 36F and the rear part 36R as different systems are more preferably formed over substantially the whole area of the corresponding front part 36F and the rear part 36R in the axial direction. Thus, the cooling medium paths 18 are formed over substantially the whole area of the housing 36 in the axial direction.

One end (front end) of the cooling medium path 18 formed at the outer peripheral surface of the front part 36F is connected to the communication path (first communication path 19) that passes through the inside of the front part 36F. The communication path 19 is formed inside the front part 36F along the axial center direction and connected to the outside of the housing 36. Similarly, the other end (rear end) of the cooling medium path 18 of the front part 36F is connected to the communication path (second communication path 20) that passes through the inside of the front part 36F. The second communication path 20 is a path different from the first communication path 19, formed inside the front part 36F along the axial center direction, and connected to the outside of the housing 36.

The cooling medium introduced via the first communication path 19 reaches the front end of the cooling medium path 18 (18F) and then flows through the cooling medium path 18 (18F). Thus, the cooling medium circles around the vicinity of the front surface of the front part 36F to cool the whole area in the periphery direction of the front part 36F from the outer peripheral surface side of the housing 36. The cooling medium reaching the rear end of the cooling medium path 18 (18F) is discharged to the outside of the housing 36 via the second communication path 20. The cooling medium may be introduced in the direction opposite to the above, i.e., it may be introduced in the order of the second communication path 20, the cooling medium path 18, and the first communication path 19.

On the other hand, the configuration of the cooling medium path 18 formed at the outer peripheral surface of the rear part 36R and the flowing mode of the cooling medium are substantially the same as those of the front part 36F.

That is, in the rear part 36R, spiral grooves 18R are formed along the outer peripheral surface from the rear end side to the front end side of the rear part 36R. The spiral grooves 18R as a single line constitute the cooling medium path 18. The front end and the rear end of the cooling medium path 18 formed on the outer peripheral surface side of the rear part 36R are connected to the outside of the housing 36 by the communication paths (third communication path 21 and fourth communication path 22) that pass through the inside of the rear part 36R.

The cooling medium introduced via the third communication path 21 reaches the rear end of the cooling medium path 18 (18R) and then flows through the cooling medium path 18. Thus, the cooling medium circles around the vicinity of the front surface of the rear part 36R to cool the whole area in the periphery direction of the rear part 36R from the outer peripheral surface side of the housing 36. The cooling medium reaching the front end of the cooling medium path 18 (18R) is discharged to the outside of the housing 36 via the fourth communication path 22. The cooling medium may be introduced in the direction opposite to the above.

A method for forming the spiral cooling medium paths 18 (18F and 18R) at the outer peripheral surface of the housing 36 is the same as that of the first embodiment.

As described above, in order to prevent the end of the housing 36 on the side where the multi-component force measurement sensor 9 is fixed from being deformed in the radial direction, the housing 36 has the configuration that cools a predetermined area in the periphery direction thereof. More specifically, in the housing 36, the cooling medium path 18 is arranged so as to spirally circle around the outer peripheral surface of the housing 36 multiple times such that the cooling medium path 18 is formed in at least the whole area in the periphery direction and the axial direction of the front part 36F where the multi-component force measurement sensor 9 is fixed. At least variations in temperature in the periphery direction of the end of the housing 36 on the side where the multi-component force measurement sensor 9 is fixed can be prevented in such a manner that the cooling medium is caused to flow through the cooling medium path 18. As a result, it becomes possible to prevent only the temperature of part in the periphery direction from being higher than those of other parts in the periphery direction (large difference in temperature in the periphery direction) at the end of the housing 36 on the side where the multi-component force measurement sensor 9 is fixed. Thus, it becomes possible to prevent only the part in the periphery direction of the housing 36 on the side where the multi-component force measurement sensor 9 is fixed from extending in the radial direction. That is, it becomes also possible to prevent error components resulting from the difference in extending amount from acting on the multi-component force measurement sensor 9 connected to the housing 36. Therefore, the accuracy of the multi-component force measurement sensor 9 is not reduced due to the strains of the end of the housing 36 caused by the heat generated in the bearing parts 5. That is, even if the heated bearing parts 5 are not positively cooled by the lubricating oil, the accuracy of the multi-component force measurement sensor 9 can be improved by cooling both the bearing part 5 and the housing 36 over the whole periphery.

Moreover, when the cooling medium paths 18 are spirally arranged over substantially the whole area of the housing 36 in the axial direction so as to circle around the outer periphery surface of the housing 36 multiple times and the cooling medium is caused to flow through the cooling medium paths 18, it becomes possible to uniformly cool the housing 36 over the whole area in the periphery direction and the axial direction. As a result, the strains of the housing 36 caused by the heat generated in the bearing parts 5 can be more reliably prevented.

In addition, the cooling medium paths 18 divided into two in the axial center direction are provided at the housing front part 36F and the housing rear part 36R, and the cooling medium is separately supplied to the independent cooling medium paths 18. Thus, it becomes possible to independently cool the housing front part 36F and the housing rear part 36R in accordance with the conditions of the heat generated in the housing 36. For example, there may be a case that the heat generated in the front part of the housing 36 becomes larger than that generated in the rear part of the housing 36 depending on the distribution of the forces applied to the spindle shaft 4 and the arrangement of the bearing parts 5. In this case, the amount of the cooling medium flowing through the housing front part (front part 36F) is made larger than that of the cooling medium flowing through the housing rear part (rear part 36R), whereby the front side of the housing 36 where the heat is generated in large amounts can be effectively cooled. As a result, it becomes possible to more reliably prevent a reduction in the accuracy of the multi-component force measurement spindle unit 1.

Note that the embodiments disclosed herein are provided for illustrative purposes only in all respects and the present invention is not limited to the embodiments. For example, the tire testing machine using the rotation drum is exemplified in the embodiments herein, but the present invention is not limited to the tire testing machine concerned. In addition, the rolling resistance testing machine is exemplified in the embodiments herein, but the present invention is not limited to the rolling resistance testing machine concerned. Particularly, matters not explicitly disclosed in the embodiments herein, such as driving conditions, operating conditions, various parameters, and the sizes, weights, and volumes of constituents, do not extend beyond ranges normally used by those skilled in the art, and take values that could be easily predicted by those skilled in the art.

Note that in providing the bearing parts 5, it is desirable to apply an appropriate preload onto the two front and rear bearing parts 5 in the axial direction using bearing nuts, etc. With the application of an appropriate preload like this, it is possible to prevent gaps between the rolling elements and the rolling surfaces of the bearing parts 5, hardly cause the deformation of the rolling elements, and reduce the heat generated in the bearing parts 5.

In addition, the multi-component force measurement sensor 9 may be a sensor other than a six-component force measurement sensor, i.e., a three-component force measurement sensor or a five-component force measurement sensor. Further, all the strain elements may have the same thickness.

Moreover, the cooling medium may be supplied to the cooling medium paths 18 via a pipeline connected to the outer periphery side of the inner sleeve 6. In this case, the pipeline for supplying the cooling medium is desirably provided so as to penetrate in the radial direction of the outer sleeve 7 in a non-contact state. Similarly, the cooling medium may be discharged from the cooling medium paths 18 via a pipeline connected to the outer periphery side of the inner sleeve 6. In this case, the pipeline for discharging the cooling medium may be desirably provided so as to penetrate in the radial direction of the outer sleeve 7 in a non-contact state. Providing the pipelines like this causes the temperature in the periphery direction of the inner sleeve 6 to be more uniformly and easily reduced rather than forming paths in the inner sleeve 6.

Overview of the Embodiments

An overview of the above embodiments is as follows.

(1) A multi-component force measurement spindle unit of a tire testing machine according to an embodiment includes: a spindle shaft on which a tire can be mounted; an inner sleeve that rotatably supports the spindle shaft via a bearing part; an outer sleeve arranged on an outside of the inner sleeve along an axial center direction of the spindle shaft; a multi-component force measurement sensor that connects an end of the inner sleeve and an end of the outer sleeve to each other and is capable of measuring a load acting on the outer sleeve from the inner sleeve; and a cooling part that cools the inner sleeve.

With this configuration, forces and moments applied to the tire can be accurately measured by preventing thermal deformation in the inner sleeve.

(2) In the multi-component force measurement spindle unit of a tire testing machine, the multi-component force measurement sensor may be provided at either end of the inner sleeve in an axial direction thereof, and the cooling part may cool a predetermined area of the inner sleeve in the axial direction.

With this configuration, it becomes possible to uniformly cool a predetermined area of the inner sleeve in the axial direction. Thus, a difference in extending amount along the axial center direction between the inner sleeve and the outer sleeve, which is caused when only the temperature of the inner sleeve becomes high, can be prevented. Because of this, strains (internal forces) based on the difference in extending amount do not act on the multi-component force measurement sensors as error components.

(3) In the multi-component force measurement spindle unit of a tire testing machine, the multi-component force measurement sensor may be provided only at one end of the inner sleeve in an axial direction thereof, and the cooling part may cool a predetermined area of the inner sleeve in a periphery direction thereof.

With this configuration, variations in temperature in the periphery direction of a housing where the multi-component force measurement sensor is fixed can be prevented. Thus, it becomes possible to prevent only the temperature of part in the periphery direction of the housing from being higher than those of other parts in the periphery direction (large difference in temperature in the periphery direction). Therefore, it becomes possible to prevent only part in the periphery direction of the housing from extending in the radial direction and prevent error components resulting from the difference in extending amount from acting on the multi-component force measurement sensor. As a result, a reduction in the accuracy of the multi-component force measurement sensor due to the strains of the housing caused by the heat generated in the bearing part can be prevented.

(4) In the multi-component force measurement spindle unit of a tire testing machine, the cooling part may be formed along an outer peripheral surface of the inner sleeve and include a cooling medium path through which a cooling medium for cooling flows, and the inner sleeve may be cooled when the cooling medium flows through the cooling medium path.

(5) In the multi-component force measurement spindle unit of a tire testing machine, the cooling medium path may be spirally formed along the axial direction of the inner sleeve.

With this configuration, it becomes possible to cool the inner sleeve over the whole area in the axial direction and the periphery direction by causing the cooling medium to flow through the spiral cooling medium path.

(6) In the multi-component force measurement spindle unit of a tire testing machine, the cooling medium path may include a first cooling medium path formed at a front part of the inner sleeve in an axial direction thereof and a second cooling medium path formed at a rear part of the inner sleeve in the axial direction, and the first cooling medium path and the second cooling medium path may be independently formed such that the front part and the rear part of the inner sleeve can be cooled separately.

With this configuration, it becomes possible to independently cool the front part and the rear part of the inner sleeve in accordance with the conditions of the heat generated in the inner sleeve.

(7) The multi-component force measurement spindle unit of a tire testing machine may further include a temperature rising part that is provided in the outer sleeve and rises a temperature of the outer sleeve.

With this configuration, the outer sleeve is heated and held at a predetermined temperature when the temperature of the inner sleeve is risen by the heat generated in the bearing part, whereby the temperature of the outer sleeve can get close to the temperature of the inner sleeve. Thus, a difference in extending amount along the axial center direction hardly occurs between the outer sleeve and the inner sleeve. As a result, a reduction in the accuracy of the multi-component force measurement sensor can be prevented.

(8) In the multi-component force measurement spindle unit of a tire testing machine, the multi-component force measurement sensor may include a force applied body provided on an inner periphery side, a fixed body arranged on an outer periphery side of the force applied body, a plurality of strain elements connecting the force applied body and the fixed body to each other in a radial direction, and strain gauges provided in the strain elements, the force applied body may be connected to the inner sleeve, and the fixed body may be connected to the outer sleeve.

(9) In the multi-component force measurement spindle unit of a tire testing machine, the plurality of strain elements may include the strain elements extending in a vertical direction and the strain elements extending in a horizontal direction, and the strain elements extending in the vertical direction may be formed to be thinner than the strain elements extending in the horizontal direction.

With this configuration, the strain elements extending in the vertical directions are likely to be deformed when small loads are applied in the horizontal direction compared with a case where all strain elements are the same and thick as in the related art. Therefore, the multi-component force measurement spindle unit can measure forces (e.g., rolling resistance) in the horizontal direction applied to the tire at a high sensitivity.

This application is based on Japanese Patent application No. 2012-066106 and No. 2012-066107 filed in Japan Patent Office on Mar. 22, 2012, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A multi-component force measurement spindle unit of a tire testing machine, comprising:
   a spindle shaft provided for mounting a tire;
   an inner sleeve that rotatably supports the spindle shaft via a bearing part;
   an outer sleeve arranged on an outside of the inner sleeve along an axial center direction of the spindle shaft;
   a multi-component force measurement sensor that connects an end of the inner sleeve and an end of the outer sleeve to each other, provided for measuring a load acting on the outer sleeve from the inner sleeve; and
   a cooling part provided at the inner sleeve for cooling the inner sleeve.

2. The multi-component force measurement spindle unit of a tire testing machine according to claim 1, wherein the multi-component force measurement sensor is provided at either end of the inner sleeve in an axial direction thereof, and the cooling part cools a predetermined area of the inner sleeve in the axial direction.

3. The multi-component force measurement spindle unit of a tire testing machine according to claim 1, wherein the multi-component force measurement sensor is provided only at one end of the inner sleeve in an axial direction thereof, and the cooling part cools a predetermined area of the inner sleeve in a periphery direction thereof.

4. The multi-component force measurement spindle unit of a tire testing machine according to claim 1, wherein the cooling part is formed along an outer peripheral surface of the inner sleeve and includes a cooling medium path through which a cooling medium for cooling flows, and the inner sleeve is cooled when the cooling medium flows through the cooling medium path.

5. The multi-component force measurement spindle unit of a tire testing machine according to claim 4, wherein the cooling medium path is spirally formed along an axial direction of the inner sleeve.

6. The multi-component force measurement spindle unit of a tire testing machine according to claim 4, wherein the cooling medium path includes a first cooling medium path formed at a front part of the inner sleeve in an axial direction thereof and a second cooling medium path formed at a rear part of the inner sleeve in the axial direction, and the first cooling medium path and the second cooling medium path are independently formed such that the front part and the rear part of the inner sleeve can be cooled separately.

7. The multi-component force measurement spindle unit of a tire testing machine according to claim 1, further comprising: a temperature rising part that is provided in the outer sleeve and rises a temperature of the outer sleeve.

8. The multi-component force measurement spindle unit of a tire testing machine according to claim 1, wherein the multi-component force measurement sensor includes a force applied body provided on an inner periphery side, a fixed body arranged on an outer periphery side of the force applied body, a plurality of strain elements connecting the force applied body and the fixed body to each other in a radial direction, and strain gauges provided in the strain elements, and the force applied body is connected to the inner sleeve, and the fixed body is connected to the outer sleeve.

9. The multi-component force measurement spindle unit of a tire testing machine according to claim 8, wherein the plurality of strain elements includes the strain elements extending in a vertical direction and the strain elements extending in a horizontal direction, and the strain elements extending in the vertical direction are formed to be thinner than the strain elements extending in the horizontal direction.

* * * * *